(12) United States Patent
Toyama et al.

(10) Patent No.: US 9,045,092 B2
(45) Date of Patent: Jun. 2, 2015

(54) WIRING HARNESS

(75) Inventors: Eiichi Toyama, Kosai (JP); Shigemi Hashizawa, Kosai (JP); Tatsuya Oga, Kosai (JP); Hidehiro Ichikawa, Kosai (JP)

(73) Assignee: Yazaki Corporation, Tokyo (JP)

( * ) Notice: Subject to any disclaimer, the term of this patent is extended or adjusted under 35 U.S.C. 154(b) by 295 days.

(21) Appl. No.: 13/634,644

(22) PCT Filed: Feb. 7, 2011

(86) PCT No.: PCT/JP2011/052510
§ 371 (c)(1),
(2), (4) Date: Sep. 13, 2012

(87) PCT Pub. No.: WO2011/114801
PCT Pub. Date: Sep. 22, 2011

(65) Prior Publication Data
US 2013/0008710 A1  Jan. 10, 2013

(30) Foreign Application Priority Data
Mar. 16, 2010  (JP) ................................. 2010-059108

(51) Int. Cl.
*H02G 3/04* (2006.01)
*B60R 16/02* (2006.01)
*H02G 3/32* (2006.01)

(52) U.S. Cl.
CPC ......... *B60R 16/0207* (2013.01); *B60R 16/0215* (2013.01); *H02G 3/0468* (2013.01); *H02G 3/0487* (2013.01); *H02G 3/32* (2013.01)

(58) Field of Classification Search
CPC .................................. H02G 3/04; H02G 3/32
USPC ....................................................... 174/70 C
See application file for complete search history.

(56) References Cited

U.S. PATENT DOCUMENTS 6,933,440 B2 * 8/2005 Ichikawa et al. .............. 174/507
7,094,970 B2   8/2006 Kihira

FOREIGN PATENT DOCUMENTS

| JP | 02-038798 A | 2/1990 |
|----|-------------|--------|
| JP | 2038798 A * | 2/1990 |
| JP | 2002-176716 A | 6/2002 |
| JP | 2004-171952 A | 6/2004 |
| JP | 2009-142060 A * | 6/2009 |
| JP | 2009-274535 A | 11/2009 |
| JP | 2009274535 A * | 11/2009 |
| JP | 2010-012868 A | 1/2010 |
| WO | WO-2012/098907 A1 | 7/2012 |

OTHER PUBLICATIONS

Supplementary European Search Report dated Mar. 28, 2014, issued for the European patent application No. 11755991.4.
International Search Report dated Apr. 26, 2011, issued for PCT/JP2011/052510.

* cited by examiner

*Primary Examiner* — Timothy Thompson
*Assistant Examiner* — Charles Pizzuto
(74) *Attorney, Agent, or Firm* — Locke Lord LLP

(57) ABSTRACT

A wiring harness includes: a harness main body having a plurality of high voltage electrically conductive paths; and a half pipe as a harness attachment member. The half pipe is formed in a substantially roof gutter shape. The half pipe is provided on a cabling target portion of a vehicle floor where the harness main body is cabled and fixed to the vehicle floor with the substantially roof gutter shape.

1 Claim, 5 Drawing Sheets

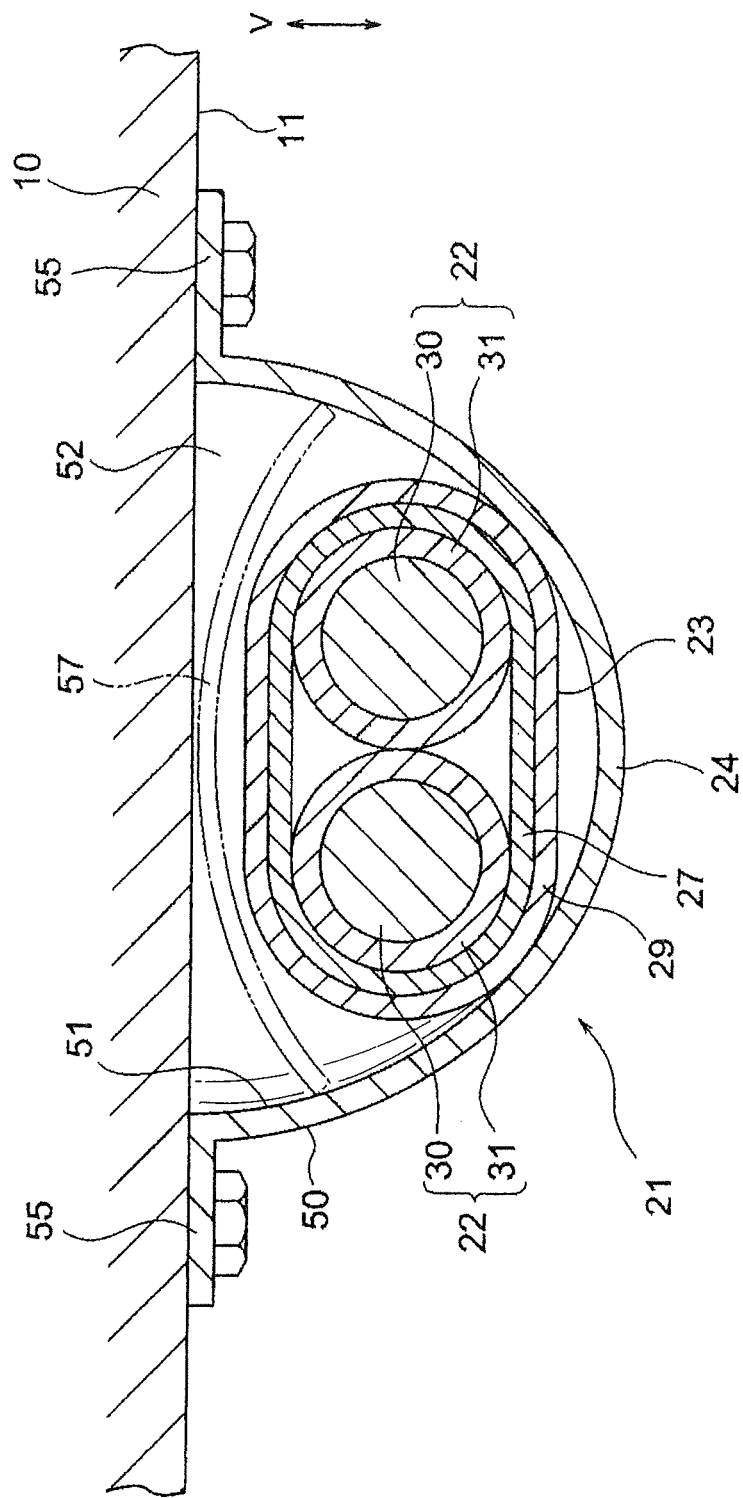

WIRING HARNESS

TECHNICAL FIELD

This invention relates to a wiring harness configured to be cabled in a vehicle.

BACKGROUND ART

A wiring harness disclosed in below-listed PTL 1 includes: a plurality of non-shielded electric wires; and a metallic shield pipe. The non-shied electric wires are inserted into the shield pipe so as to attain electromagnetic shield and to be protected against outside influences.

CITATION LIST

Patent Literature

[PTL 1]
JP, A, 2004-171952

SUMMARY OF INVENTION

Technical Problem

In the above conventional wiring harness, it is necessary to bend the shield pipe. In this case, the non-shielded electric wires are previously inserted into the shield pipe. Therefore, there is a problem that a production process of the wiring harness is restricted. Further, regarding an insertion operation of the non-shielded electric wires, if the shield pipe is a large radius, the insertion operation is easy. However, practically, the shield pipe is a small radius, and there is a problem that the insertion operation is difficult and troublesome.

Incidentally, in recent vehicle components, weight saving is required. Therefore, it is important to meet this demand.

In view of the above conditions, an object of the present invention is to provide a wiring harness able to increase flexibility of a production process, to improve workability, and to save weight.

Solution to Problem

For attaining the object, according to a first aspect of the present invention, there is provided a wiring harness including:
a harness main body having a plurality of high voltage electrically conductive paths; and
a harness attachment member provided on a cabling target portion of a vehicle floor where the harness main body is cabled and fixed to the vehicle floor,
wherein the harness attachment member is formed in a substantially roof gutter shape in which a side opposite to the vehicle floor and a side through which the harness main body is guided out are continuously opened.

According to the present invention having such a feature, when the harness main body is received in the substantially roof gutter shaped harness attachment member, and the harness attachment member is fixed to the vehicle floor, the harness main body is cabled along the vehicle floor. Because the harness attachment member is the substantially roof gutter shape, and three sides of the harness attachment member are continuously opened, the harness main body is easily received in the harness attachment member without insertion of the harness main body to the harness attachment member. Further, because the harness attachment member is formed in the substantially roof gutter shape, flexibility of a production process of the wiring harness is increased. Compared to a pipe having the same size, the harness attachment member saves more weight than the pipe at least due to an opening side opposite to the vehicle floor. In the present invention, the high voltage electrically conductive path is a high voltage electric wire, a bus bar, or the like.

According to a second aspect of the present invention, there is provided the wiring harness as described in the first aspect, further including:
a main body protective member interposed between the harness main body and the vehicle floor.

According to the present invention having such a feature, when a burr is generated on the vehicle floor, and a condition of the cabling target portion is rather bad, the main body protective member prevents the harness main body from being damaged.

According to a third aspect of the present invention, there is provided the wiring harness as described in the first aspect or the second aspect, wherein the harness main body is received in a manner to be abutted on an inner wall of the harness attachment member directly or indirectly.

According to the present invention having such a feature, heat generated in the harness main body is transmitted to the vehicle floor side via the harness attachment member. Further, the heat generated in the harness main body is radiated from an outer wall of the harness attachment member.

Advantageous Effects of Invention

According to the invention as described in the first aspect, when the harness attachment member is included, and formed in the substantially roof gutter shape, the flexibility of the production process of the wiring harness is increased compared to the conventional wiring harness. Further, by forming the harness attachment member in the substantially roof gutter shape, the workability is improved, and the weight is saved compared to the conventional wiring harness.

According to the invention as described in the second aspect, in addition to the effect of the first aspect, the harness main body is prevented from being damaged.

According to the invention as described in the third aspect, in addition to the effect of the first aspect, the wiring harness has good heat radiation property.

BRIEF DESCRIPTION OF DRAWINGS

FIG. 2 is a sectional view taken on line A-A of FIG. 1A.

DESCRIPTION OF EMBODIMENTS

A wiring harness includes: a harness main body having a high voltage electrically conductive paths; and a harness attachment member. The harness attachment member is formed in a substantially roof gutter shape. The harness attachment member is provided on a cabling target portion of a vehicle floor where the harness main body is cabled and fixed to the vehicle floor with this substantially roof gutter shape.

EXAMPLE 1

Figure 1A:
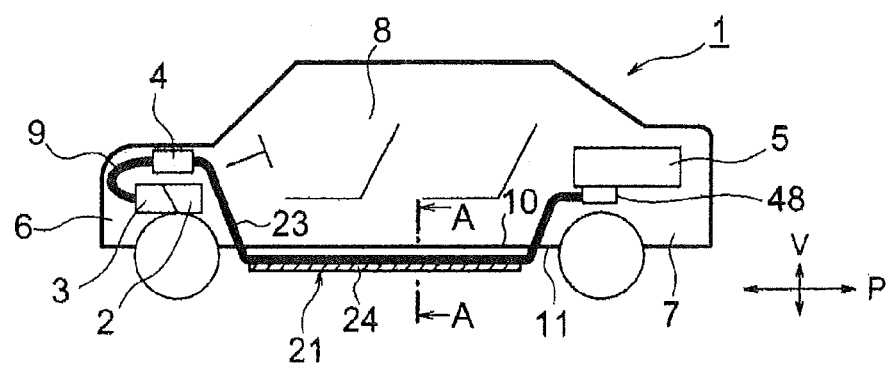
FIG. 1A is a schematic vie showing a vehicle having a wiring harness according to the present invention.
Figure 1B:
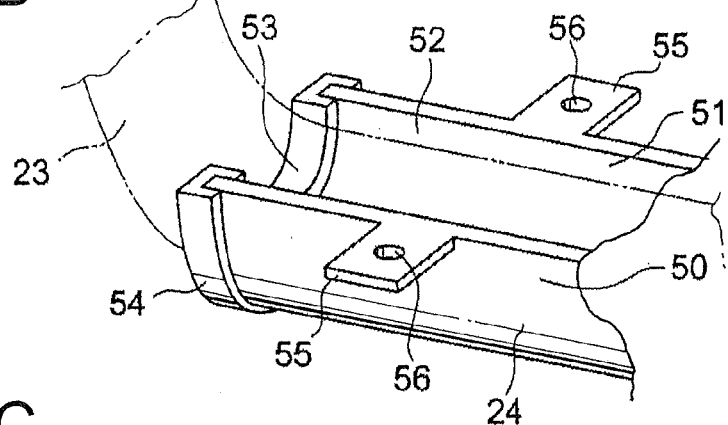
FIG. 1B is a perspective view showing a front end side of a half pipe as a harness attachment member.
Figure 1C:
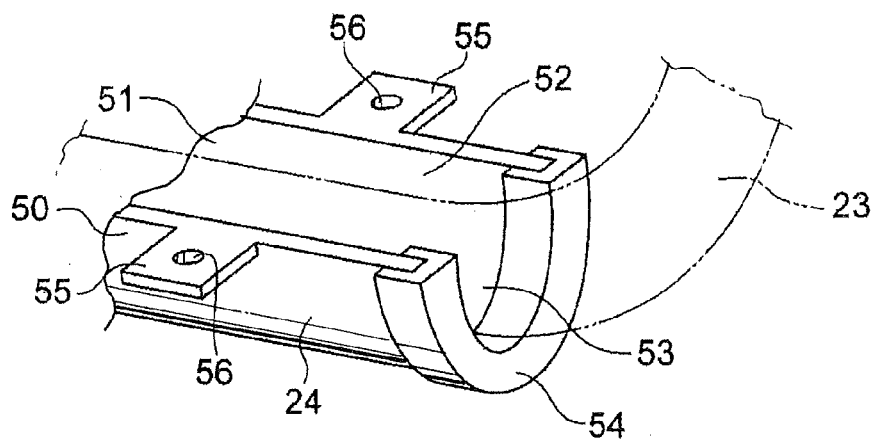
FIG. 1C is a perspective view showing a rear end of the half pipe.
Figure 3:
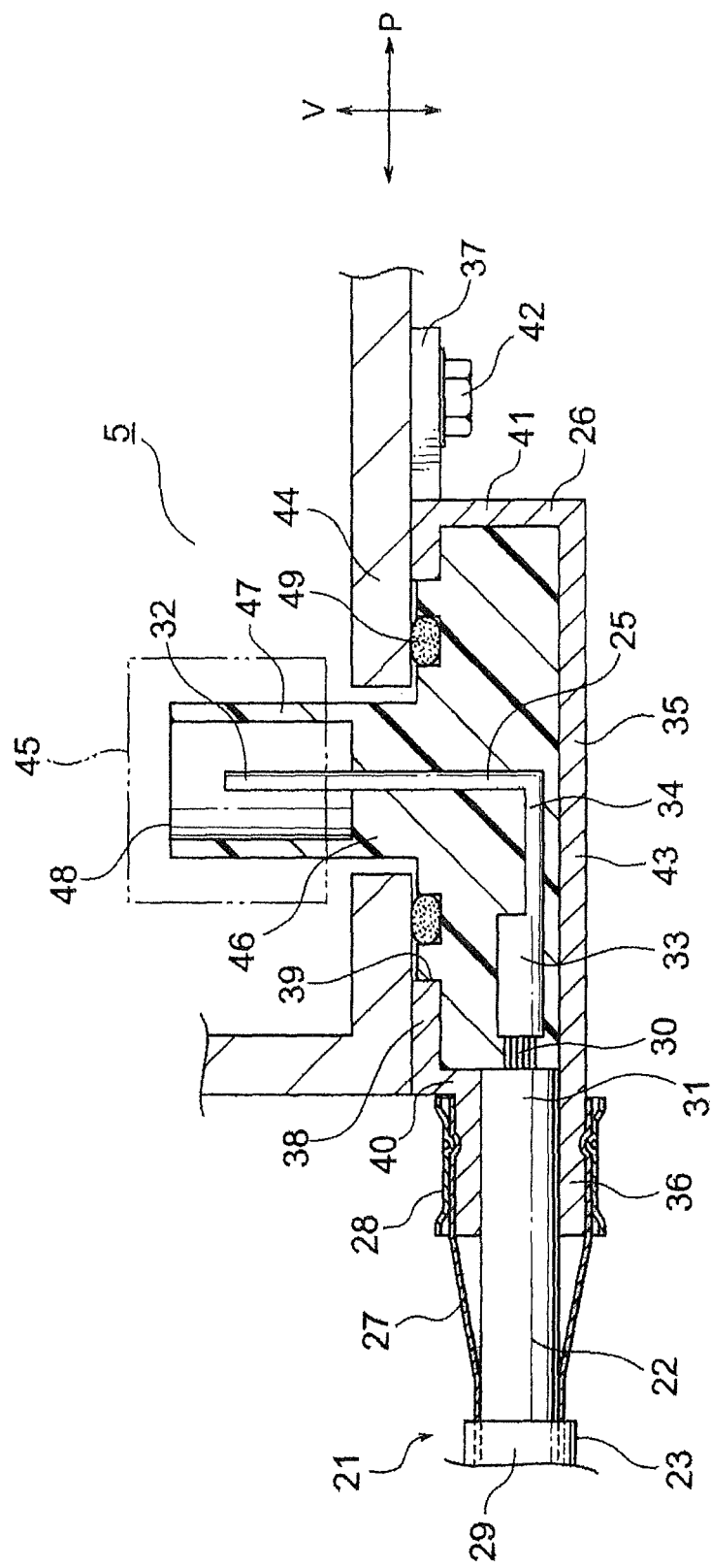
FIG. 3 is a sectional view showing an end structure of the wiring harness.
Figure 4A:
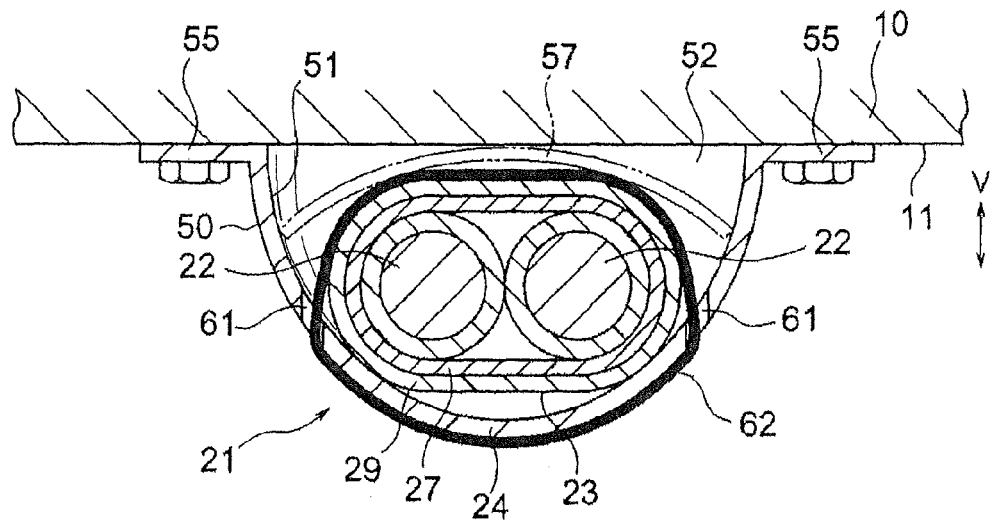
FIG. 4A is a sectional view showing an example of a fixing structure fixing a harness main body and the half pipe.
Figure 4B:
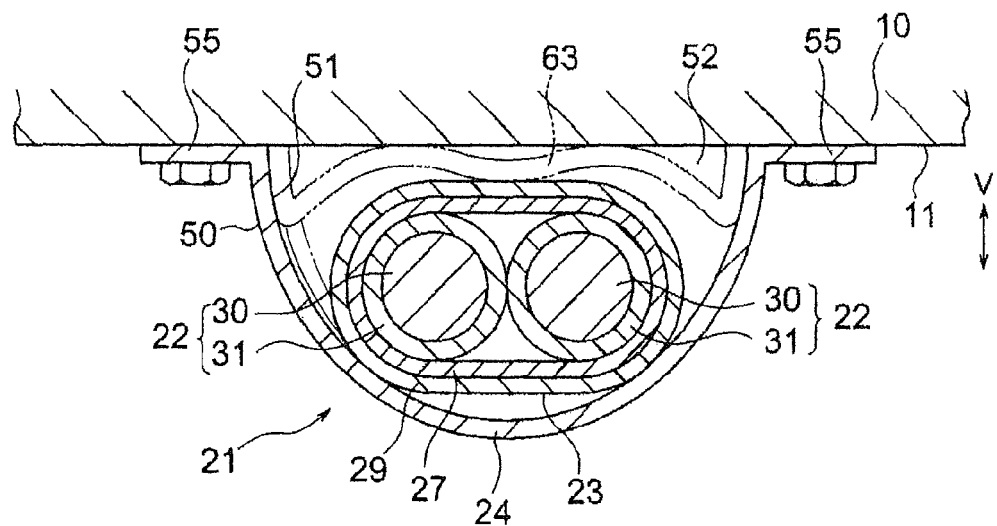
FIG. 4B is a sectional view showing the other example of a main body protective member.

Hereinafter, an embodiment will be explained with reference to drawings. FIG. 1A is a schematic view showing a vehicle having a wiring harness according to the present invention. FIG. 1B is a perspective view showing a front end side of a half pipe as a harness attachment member. FIG. 1C is a perspective view showing a rear end of the half pipe. Further, FIG. 2 is a sectional view taken on line A-A of FIG. 1A. FIG. 3 is a sectional view showing an end structure of the wiring harness. FIG. 4A is a sectional view showing an example of a fixing structure fixing a harness main body and the half pipe. FIG. 4B is a sectional view showing the other example of a main body protective member.

The wiring harness of this embodiment is cabled in a hybrid vehicle or an electric vehicle, and hereinafter will be explained with an example of the hybrid vehicle. (In a case of the electric vehicle, a configuration, a structure, and an effect of the wiring harness according to the present invention is basically the same.)

In FIG. 1, reference sign 1 denotes the hybrid vehicle. The hybrid vehicle 1 is driven by mixing two powers of an engine 2 and a motor 3. Electric power from a battery 5 (battery pack) is supplied to the motor 3 via an inverter 4. in this embodiment, the engine 2, the motor 3, and the inverter 4 are mounted on an engine room 6 where a front wheel is positioned. Further, the battery 5 is mounted on a vehicle rear side 7 where a rear wheel is positioned. (The battery may be mounted on a vehicle interior 8 at a rear side of the engine room 6.)

The motor 3 and the inverter 4 are connected to each other with a motor cable 9. Further, the battery 5 and the inverter 4 are connected to each other with a wiring harness 21 according to the present invention. The wiring harness 21 is cabled from the engine room 6 to an underfloor 11 as a ground side of a vehicle floor 10, and cabled from the underfloor 11 to the vehicle rear side 7. The wiring harness 21 is cabled straight in the underfloor 11.

Here, this embodiment will be supplementarily explained. The motor 3 includes: a motor and a generator. The inverter 4 includes: an inverter and converter. The inverter 4 is an inverter assembly, and includes, for example, an air conditioner inverter, a generator inverter, and a motor inverter. The battery 5 is Ni-MH or Li-ion and not modularized. Incidentally, for example, an electrical storage device such as capacitor can also be used. The battery 5 is not limited as long as it can be used in the hybrid vehicle 1 or the electric vehicle.

The wiring harness 21 includes: a shielded harness main boy 23 having thick high voltage electric wires 22 (high voltage electrically conductive paths) electrically connecting the inverter 4 and the battery 5; and a half pipe 24 (harness attachment member) provided on a cabling target portion of the vehicle floor 10 where the harness main body 23 is cabled. The half pipe 24 is fixed to the underfloor 11 of the vehicle floor 10. Further, the half pipe 24 is an attachment of the harness main body 23. In this embodiment, the harness main body 23 is electromagnetic shielded. However, the present invention is not limited to this (described later).

The harness main body 23 includes: a plurality of high voltage electric wires 22 as high voltage electrically conductive paths; a connecting means 25 (see FIG. 3) provided on one end of the high voltage electric wire 22 and electrically connecting to, for example, battery 5; an end fixing means 26 (see FIG. 3) made of conductive metallic material; a tubular metallic foil member 27 (shield member, see FIGS. 2 and 3) covering the high voltage electric wires 22; a metallic ring-shaped swaging member 28 (see FIG. 3) provided outside of an end of the tubular metallic foil member 27 and swaged; and an electric wire protective member 29 (see FIGS. 2 and 3) collectively protecting a protective target portion of the high voltage electric wires 22 covered by the tubular metallic foil member 27. Incidentally, the other end of the high voltage electric wire 22 is formed similar to the one end of the high voltage electric wire 22.

In FIG. 2, the number of the high voltage electric wires 22 is two in this embodiment. (The number of the high voltage electric wires 22 is illustrative. Incidentally, a low voltage electric wire may be included.) The high voltage electric wires 22 are arranged horizontally (cabled along the underfloor 11). The high voltage electric wire 22 is a thick electric wire, and a center conductor 30 positioned in the center of the high voltage electric wire 22 is made of copper, copper alloy, or aluminum. The high voltage electric wire 22 is a non-shielded electric wire, and composed of the conductive center conductor 30 and a cover 31 provided outside of the center conductor 30. The one end of the high voltage electric wire 22 is processed so that the center conductor 30 is extended straight and exposed in a specific length.

The center conductor 30 may be formed by braiding element wires or made of a bar-shaped conductor having a rectangular section or a circular section (for example, straight angle single core, or a circular single core). Further, a bus bar may be used instead of the high voltage electric wire 22. The connecting means 25 (see FIG. 3) is connected to the center conductor 30.

Incidentally, in this embodiment, the high voltage electric wire 22 made of an insulated wire is used. However, the present invention is not limited to this. A high voltage shielded electric wire (high voltage electrically conductive path) may be used. The shielded electric wire includes: a center conductor; an insulator provided outside of the center conductor; a shield member provided outside of the insulator; and a sheath provided outside of the shield member. The shield member is made of a braided wire or a metallic foil.

In FIG. 3, the connecting means 25 is an electrically connecting portion with the battery 5 and formed in a substantially tab shape at a tip thereof. The connecting means 25 includes: an electric contact portion 32 positioned at a tip thereof a wire connecting portion 33 connected to the center conductor 30 by, for example, pressure bonding; and a middle portion 34 connecting the electric contact portion 32 and the wire connecting portion 33. The electric contact portion 32 is folded so as to be perpendicular to the middle portion 34. A whole of the connecting means 25 is formed in a substantially L-shape. The connecting means 25 is electrically connected along a vertical direction shown by an arrow V in FIG. 3.

The end fixing means 26 arranges and fixes the high voltage electric wires 22 and the connecting means 25 to a specific position in a battery 5 side, and in this embodiment, made of conductive metallic material. The end fixing means 26 in this embodiment includes: a chassis 35; and a tubular connecting portion 36 and a fixing flange 37 continued to the chassis 35.

An opening 39 is provided on a top wall 38 of the chassis 35. The tubular connecting portion 36 is continued to a sidewall 40 so as to communicate with an inside. A sidewall 41 other than the sidewall 40 is continued to the fixing flange 37 at a position of the top wall 38. The fixing flange 37 is fastened and fixed by a bolt 42. The end fixing means 26 in this embodiment is fixed to the battery 5 side with the bolt 42. Incidentally, as not particularly shown, at least two fixing flanges 37 are formed. The top wall 38 is abutted on the battery 5 side. The top wall 38 works as an electrical ground.

A bottom wall 43 of the chassis 35 is formed flat and parallel to a bottom wall 44 of the battery 5 side. When the end fixing means 26 is fixed to the battery 5 side, the tubular connecting portion 36 is also arranged parallel to the bottom wall 44. Because the bottom wall 44 is extended along a horizontal direction denoted by an arrow P in FIG. 3, the tubular connecting portion 36 is extended in this direction. Incidentally, reference sign 45 denotes a connector of the battery 5 side by a virtual line.

The tubular metallic foil member 27 is inserted over an outside of the tubular connecting portion 36. Further, the tubular connecting portion 36 is electrically and mechanically connected to the tubular metallic foil member 27 by swaging with the ring-shaped swaging member 28. In this embodiment, the tubular connecting portion 36 is formed in a oblong sectional shape. Because the tubular connecting portion 36 is continued to the chassis 35, the tubular connecting portion 36 is conductive and metallic. Incidentally, the tubular connecting portion 36 may be formed as a well-known shield shell, and connected to the chassis 35 with a proper fixing means such as a bolt.

The tubular metallic foil member 27 is made of conductive metallic foil, formed in a tubular shape, and works as an electromagnetic shield. An example of the metallic foil as a component of the tubular metallic foil member 27 is preferably copper foil (of course, well-known metallic foils other than the copper foil may be used). In this embodiment, the tubular metallic foil member 27 is made of a single layer of the metallic foil. However, if there is a need to increase strength, two or three layers of the metallic foil may be used.

Incidentally, needless to say, if one of a plurality of layers is a metallic foil, the strength of the tubular metallic foil member 27 is further increased. In this case, preferably, resin sheets are laminated with the metallic foil via an adhesive layer. An example of the resin sheet is PET sheet. The metallic foil may be plated with tin (opposite side of the resin sheet). In this embodiment, the tubular metallic foil member 27 is provided for adding the electromagnetic shield function to the harness main body 23. However, if the later-described half pipe 24 works as the electromagnetic shield, the tubular metallic foil member 27 is optionally provided.

An end of the tubular metallic foil member 27 is electrically and mechanically connected to the tubular connecting portion 36 by swaging the ring-shaped swaging member 28.

The ring-shaped swaging member 28 is permanently deformed by swaging (crushing) with a not-shown swaging tool. For example, the ring-shaped swaging member 28 is formed by pressing a band-shaped metal thin plate into an oblong shape. The ring-shaped swaging member 28 is provided on an outside of an end of the tubular metallic foil member 27.

When the tubular metallic foil member 27 is electrically and mechanically connected to the tubular connecting portion 36 by swaging the ring-shaped swaging member 28, the high voltage electric wires 22 (cover 31) received in the tubular metallic foil member 27 are arranged parallel to the bottom wall 44. Incidentally, the high voltage electric wire 22 is not limited to this embodiment, and a cabtyre cable may be used as the high voltage electric wire 22. The tubular metallic foil member 27 electrically connected to the tubular connecting portion 36 is grounded at the battery 5 side via the end fixing means 26.

When the connecting means 25 provided on an end of the high voltage electric wire 22 is received in the chassis 35, the connecting means 25 is fixed by a housing 46 made of insulating resin material. A connector fixing portion 47 projected upward from the opening 39 of the top wall 38 is formed in the housing 46. The electric contact portion 32 of the connecting means 25 is exposed in an inner space of the connector fixing portion 47. By forming the housing 46, this portion works as a connector 48.

Incidentally, a method of forming the housing 46 is not particularly limited. For example, the connecting means 25 may be integrated with a resin-made sub housing, and then, a gap between the sub housing and an inner wall of the chassis 35 may be filled with resin by potting or the like.

A water-tight packing 49 is (optionally) provided on the housing 46.

The electric wire protective member 29 collectively protects a protective target portion of the high voltage electric wires 22 covered by the tubular metallic foil member 27. In this embodiment, the electric wire protective member 29 is formed by wrapping a sheet. For example, a corrugate tube may be used instead of the electric wire protective member 29. The electric wire protective member 29 is optionally provided.

In FIGS. 1A to 1C and FIG. 2, the half pipe 24 is formed in a shape (see FIG. 2) that a height (a length in a vertical direction shown by an arrow V in FIG. 1A) is shorter than a radius of a circular pipe from which the half pipe 24 is made. In this embodiment, the half pipe 24 is not made by cutting halved the circular pipe. Namely, a profile of the half pipe 24 is reduced. The half pipe 24 may be made of metal or synthetic resin, and in this embodiment, the half pipe 24 is made of metal. The material of the half pipe 24 allows that an outer wall 50 side has good heat radiation property, and an inner wall 51 side has good heat absorption property relative to the high voltage electric wire 22. (The material is not particularly limited. A preferable example is described later.) The half pipe 24 radiates heat to an outside, shields heat from an outside, and protects electric wires. The harness main body 23 is abutted on the inner wall 51 of the half pipe 24 due to the own weight of the harness main body 23 (the high voltage electric wire 22 is indirectly abutted). In this embodiment, the half pipe 24 is made by extrusion molding or press molding.

The half pipe 24 is formed in a substantially roof gutter shape continuously opening an opening 52 opposite to the underfloor 11 of the vehicle floor 10 and openings 53, 53 through which the harness main body 23 is guided out (a gutter has some shapes. a roof gutter shape as one type of them is a shape halving a pipe). The half pipe 24 is extended straight.

An edge covering member 54 for covering an edge portion is provided on each end of the openings 53, 53 of the half pipe 24. The edge covering member 54 prevents the half pipe 24 from being damaged (if an edge is not generated, there is no need to provide the edge covering member 54).

The half pipe 24 is fixed in a manner that the opening 52 faces the underfloor 11. An example of a fixing means is a plurality of brackets 55 provided corresponding to a position of the opening 52. The bracket 55 is fixed by, for example, welding, and has a through-hole 56 for fixing with a bolt. Incidentally, the present invention is not limited to the bolt for fixing, and a clip may be used. As the other fixing means, an inverted Ω shaped clamp, or a band for engaging with and holding the outer wall 50 of the half pipe 24 may be used.

The half pipe 24 is not particularly limited, but formed so as to fix the received harness main body 23. Concretely, for example, a plurality of holes is provided on the half pipe 24 for fixing the harness main body 23 with a special clamp, a common band clamp, or the like (for an example, as shown in FIG. 4A, a pair of holes 61, 61 is provided on the half pipe 24, and a well-known banding band 62 is inserted into the holes 61, 61 to fix the harness main body 23). A drainage hole other then the above holes is also provided on the half pipe 24. (The drainage hole is not shown. The drainage hole is optionally provided.)

Here, a case that the half pipe 24 is made of metal will be supplementarily explained. When the half pipe 24 is made of metal, of course, the protective performance is further increased than the half pipe 24 made of resin. Aluminum is an example of the metallic material from aspects of protective performance and weight saving. Further, stainless steel is also a preferable example from aspects of protective performance and weather resistance. Here, the half pipe 24 is made of aluminum.

Incidentally, in this embodiment, the half pipe 24 is formed in an arc sectional shape. However, the present invention is not limited to this. For example, the half pipe 24 may be formed in a opened box sectional shape. In a case of the opened box sectional shape, there is a merit that a contact area with the harness main body 23 is increased. Further, in this embodiment, the half pipe 24 is extended straight. However, the present invention is not limited to this. For example, the half pipe 24 may be bent at a proper position to change a cabling path.

In FIG. 2, reference sign 57 denotes a main body protective member. This main body protective member 57 is interposed between the harness main body 23 and the underfloor 11 of the vehicle floor 10. If a spot burr is generated in the underfloor 11, the main body protective member 57 protects the harness main body 23 and prevents the harness main body 23 from being damaged. The main body protective member 57 is provided throughout the whole half pipe 24, or provided on a position where the spot burr may be generated (the main body protective member 57 is provided optionally). The main body protective member 57 may be formed in a spring shape shown in FIG. 4B so as to push the harness main body 23 to the inner wall 51 of the half pipe 24 other than a shape denoted by a virtual line in FIG. 2. In FIG. 4B, the main body protective member 63 works as a spring to push the harness main body 23 (the shape of the main body protective member 63 is one example). In this way, when the harness main body 23 is pushed to the inner wall 51 of the half pipe 24, there is a merit that the heat generated in the harness main body 23 is surely transferred to the half pipe 24 to reduce the temperature. While the vehicle is running and a vibration is generated, the main body protective member 63 constantly pushes the harness main body 23 to the inner wall 51 of the half pipe 24. Therefore, there is a merit that a stable heat radiation effect is attained. Incidentally, a member for covering the harness main body 23 such as a corrugate tube (not shown) may be used instead of the main body protective member 57.

As above explained with reference to FIGS. 1A to 1C, 2 and 3, when the harness main body 23 is received in the substantially roof gutter shaped half pipe 24, and the half pipe 24 is fixed to the underfloor 11 of the vehicle floor 10, the harness main body 23 is cabled along the underfloor 11. Because the half pipe 24 is formed in the substantially roof gutter shape, and three sides are continuously opened, the harness main body 23 can be received easily without a conventional insertion work. Further, because the half pipe 24 is formed in the substantially roof gutter shape, there is no need to previously insert the harness main body 23 into the half pipe 24. Resultingly, the production process of the wiring harness 21 has flexibility.

For example, compared to a circular pipe in the same size, the half pipe 24 saves more weight than the circular pipe at least the opening 52 facing the underfloor 11 of the vehicle floor 10. Further, use material of the half pipe 24 can be further reduced than the circular pipe. Compared to the conventional pipe, a 50% decrease can be realized by using the half pipe 24.

In addition, because the half pipe 24 can be bent afterward, the cost of the molding die can be reduced. Further, by changing the bent, the wiring harness 21 can be used in the other type of vehicle, and the general versatility is increased. Further, the wiring harness 21 can rapidly correspond to design change.

Because the harness main body 23 contacts (is closely attached to) the inner wall 51 of the half pipe 24, the heat generated in the harness main body 23 is transferred to the underfloor 11 side of the vehicle floor 10 via the half pipe 24. Further, the heat generated in the harness main body 23 is radiated from the outer wall 50 of the half pipe 24. Namely, when the harness main body 23 contacts (is closely attached to) the inner wall 51 of the half pipe 24, the temperature of the harness main body 23 is lowered.

Because the length of the half pipe 24 is a length provided on the cabling target portion of the vehicle floor 10 where the harness main body 23 is cabled, a packaging size of the half pipe 24 can be reduced.

Of course, various modifications can be practiced within a scope of the present invention.

Figure 5A:
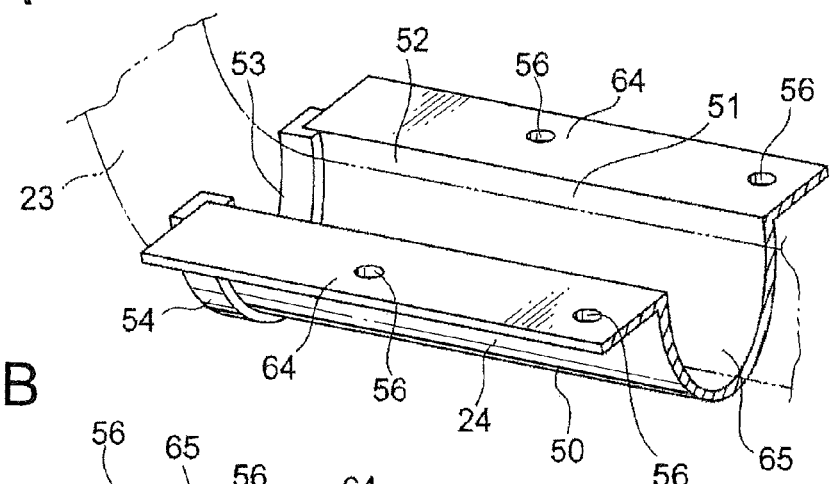
FIG. 5A is a perspective view showing the other example of the half pipe.
Figure 5B:
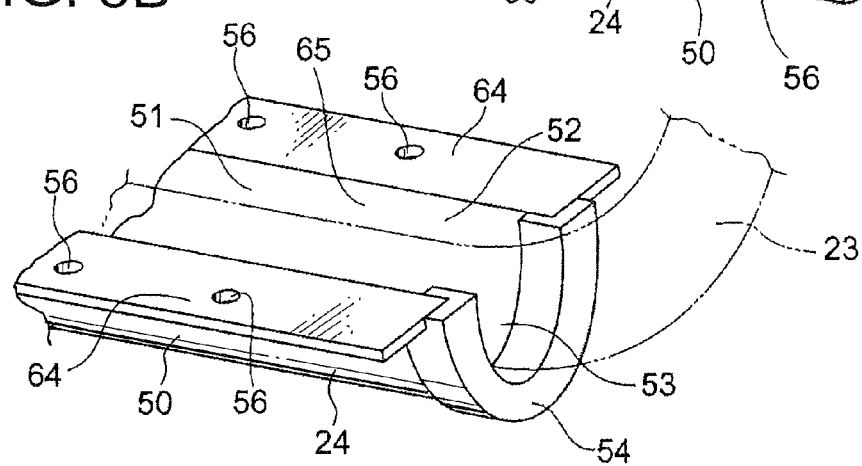
FIG. 5B is a perspective view showing the other example of the half pipe.

In the above explanation, the bracket 55 is a separate component from the half pipe 24, and for example, fixed to the half pipe 24 by welding. However, the present invention is not limited to this. As shown in FIGS. 5A and 5B, the bracket 55 may be integrally formed with the half pipe 24. In a case of FIG. 5, a bracket portion 64 is integrally formed with a pipe main body 65 by extrusion molding. The bracket portion 64 is integrally formed throughout a whole edge of the opening 52.

REFERENCE SIGNS LIST 1 hybrid vehicle
2 engine
3 motor
4 inverter
5 battery
6 engine room
7 vehicle rear side
8 vehicle interior
9 motor cable
10 vehicle floor
11 underfloor
21 wiring harness
22 high voltage electric wire (high voltage electrically conductive path)
23 harness main body
24 half pipe (harness attachment member)
25 connecting means
26 end fixing means
27 tubular metallic foil member (shield member)
28 ring-shaped swaging member
29 electric wire protective member
30 center conductor
31 cover
32 electric contact portion
33 wire connecting portion 34 middle portion
35 chassis
36 tubular connecting portion
37 fixing flange
38 top wall
39 opening
40, 41 sidewall
42 bolt
43, 44 bottom wall
45 connector
46 housing
47 connector fixing portion
48 connector
49 packing
50 outer wall
51 inner wall
52, 53 opening
54 edge covering member
55 bracket
56 through-hole
57 main body protective member

The invention claimed is:

1. A wiring harness comprising:
a harness main body having a plurality of high voltage electrically conductive paths; and
a harness attachment member provided on a cabling target portion of a vehicle floor where the harness main body is cabled and fixed to the vehicle floor,
wherein the harness attachment member is formed in a substantially roof gutter shape in which a side opposite to the vehicle floor and a side through which the harness main body is guided out are continuously opened,
wherein the wiring harness further comprises a main body protective member interposed between the harness main body and the vehicle floor and working as a spring to push the harness main body to an inner wall of the harness attachment member so that the harness main body is received in a manner to be abutted on the inner wall of the harness attachment member directly or indirectly.

* * * * *